Patented Jan. 31, 1933

1,895,798

UNITED STATES PATENT OFFICE

STEWART ROY ILLINGWORTH, OF RADYR, WALES, ASSIGNOR TO THE ILLINGWORTH CARBONIZATION COMPANY, LIMITED, OF MANCHESTER, ENGLAND

APPARATUS FOR FEEDING COAL OR OTHER GRANULAR MATERIAL

Application filed December 15, 1931, Serial No. 581,237, and in Great Britain December 19, 1930.

This invention relates to apparatus for feeding or charging coal or other granular material into a container and is an improvement in or modification of the invention described in the specification of my prior Patent No. 1,800,633.

The apparatus of this invention is more especially intended for use in tamping the charge of carbonizing retorts, where the available space above the retorts is restricted.

In my said prior patent specification the tamping members are, for this purpose, telescopic, being made in tubular sections which are connected with one another by means of automatic gravity operated clutches.

It has been found that in certain cases, these clutches are liable to "seize", and which is very inconvenient, particularly if the tamping mechanism is to be removed quickly, should for instance, the retorts catch fire.

The main object of the present invention is to provide a more readily withdrawable form of tamping member and to dispense with the necessity of the multiple clutch mechanisms employed in the telescopic form, while retaining the advantages (as to space) of the latter.

According to the present invention, I employ as the tamping rod, a wire rope or the like to the end of which is attached a weight forming the tamping head, means being provided to take up slack in the rope with the rise of material in the carbonizing retort or other container.

Reciprocating movement may be imparted to the tamping member by passing the rope over a pulley mounted in line with the vertical axis of the retort, to which pulley is imparted an up and down motion. Slack in the rope may be taken up by passing the rope over a second pulley, that is carried by a guide block mounted to slide upon a vertical brake bar. The pulley and guide block function as a counterpoise, the block having a clutch or brake adapted to exert a braking action on the bar to prevent the upward movement of the block and the pulley due to the weight of the tamping member, the arrangement being such that the tension in the rope due to the weight of the tamping head normally holds the brake in its brake-on position, the brake automatically being released when the tension in the rope is relieved by engagement of the tamping head with the head of the charge in the retort. At this time therefore, the brake will be "off" and the pulley guide block free to fall under its own weight so that any slack in the rope due to the rise of material subsequent to the preceding tamping stroke will be taken up. It will be appreciated that the weight of the pulley block should be appreciably less than that of the tamping head but greater than the weight of the rope.

In an alternative form of mechanism for imparting up and down reciprocating movement to the tamping member, the rope of the latter is passed over a friction pulley, which is loosely mounted on its shaft to permit the pulley to rotate freely thereon, and an intermittent rotational movement is imparted to the friction pulley in order to rotate the same sufficient to raise the tamping member.

The rope may be given one or more turns round the friction pulley and this, coupled with the fact that the counterpoise and tamping member are arranged to partly balance each other will cause the rope to grip the friction pulley. Intermittent rotational movement may be imparted to the friction pulley by a revolving disc having a segmental portion adapted to enter into driving engagement with the friction pulley.

The invention is illustrated in the accompanying drawings as applied to carbonizing apparatus, in which:—

Figure 15 is an elevation showing an alternative construction of mechanism for imparting up and down movement to the tamping ropes, while Figures 16–20 are detail views of the same, Figure 16 being a sectional view of the friction pulley and Figures 17 and 18 views of the cam disc for actuating the same.

Figures 19 and 20 are views of the counterpoise.

In the drawings A indicates generally the top of the brickwork retort setting in which are mounted metal conductors B forming the carbonizing retorts. The conductors may as shown consist of H section plates held at their top ends by a cap C.

D indicates generally the tamping car which is built up of a rectangular frame E supported at its sides upon rollers F running on rails G carried by framework H, which also supports a service bunker J. K is a motor for travelling the carriage.

Figure 1:
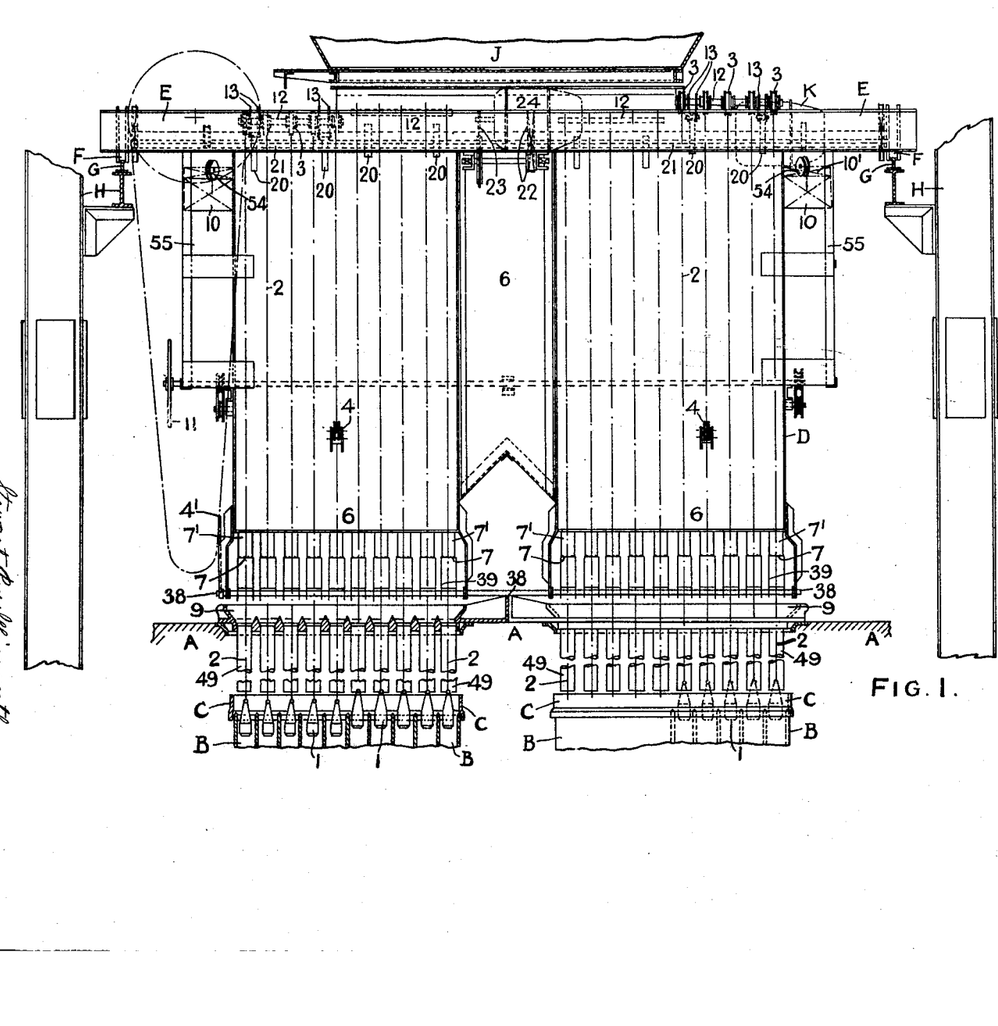
Figure 1 is a general elevation of the tamping carriage viewed from the tamping side of the same and showing also the tops of the carbonizing retorts.
Figure 2:
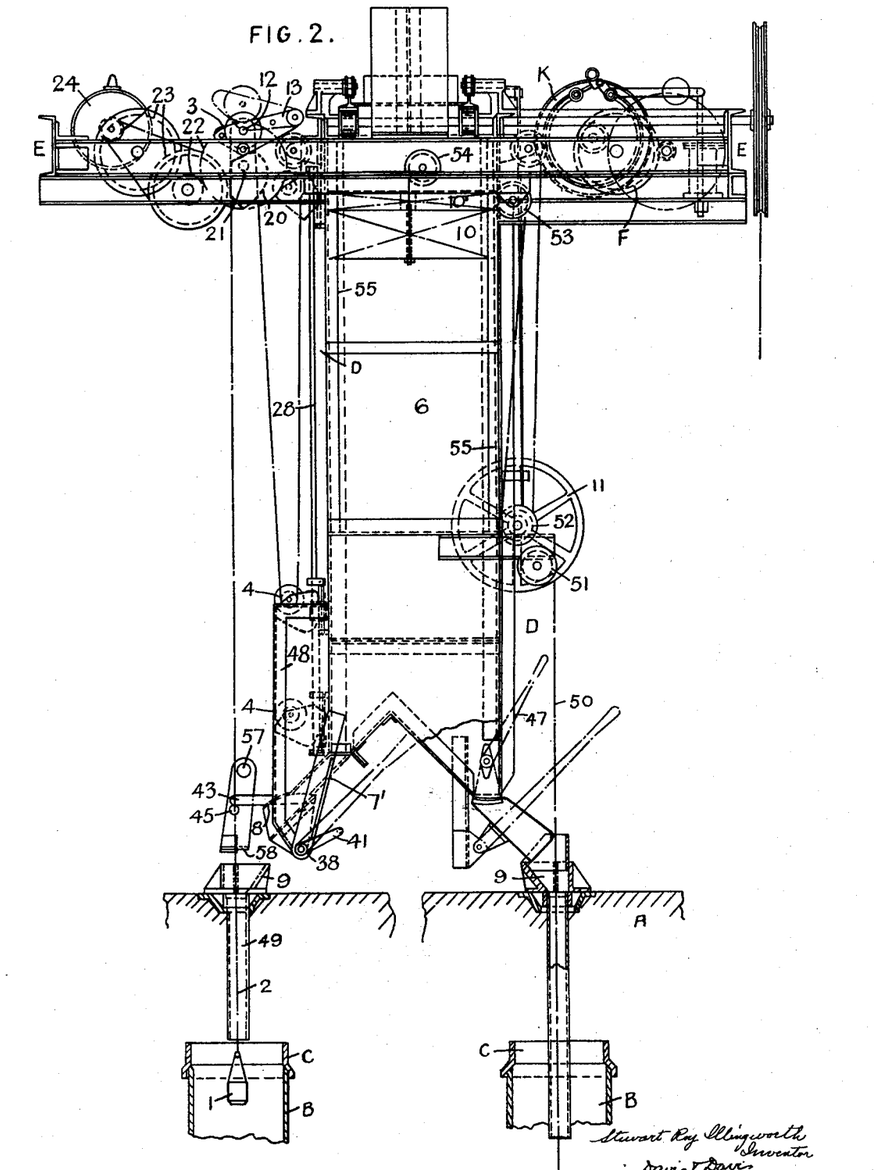
Figure 2 is an end elevation of the same.

Referring now more particularly to Figures 1 and 2, the tamping members consist of weights 1 attached to the lower ends of wire ropes 2 (alternatively chains may be employed) which ropes 2 are passed over pulleys 3 (see also Figures 3–5) to which pulley mechanism an up and down movement is imparted as hereinafter explained. From the pulleys 3 the rope is passed round a second pulley 4 (see also Figures 6–9) forming part of a counterweight when the end of the rope is made fast to a bar 5 supported by brackets (see Figure 4) on the framework of the carriage.

In operation coal is fed from the bunker J into a central hopper 6 on the carriage, from the lower end of which it is discharged through openings 7 on either side past discharge doors 8 into tundishes 9 and thence into each carbonizing retort.

The tundishes 9 (as more particularly hereinafter described) are counterbalanced by weights 10 and can be removed from the tops of the retorts by lifting gear, the hand wheel for raising and lowering the same being indicated at 11.

*Pulley mechanism for actuating tamping members*

Figure 3:
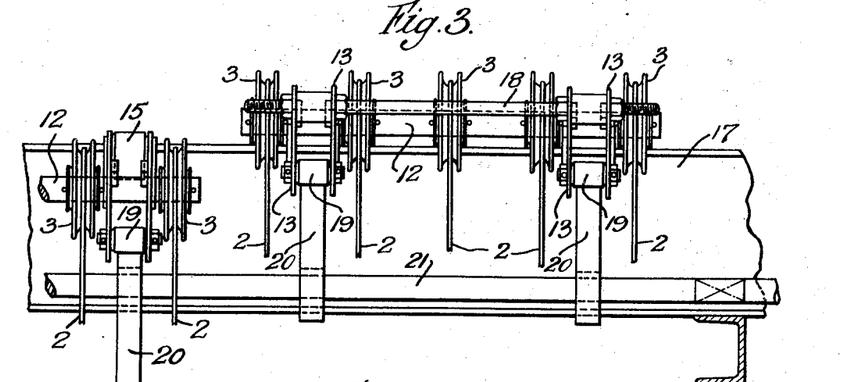
Figures 3, 4 and 5 are detail views on a larger scale, being respectively an elevation, an endwise view and plan, of the supporting pulleys for the tamping ropes or chains for imparting up and down movement thereto.
Figure 4:
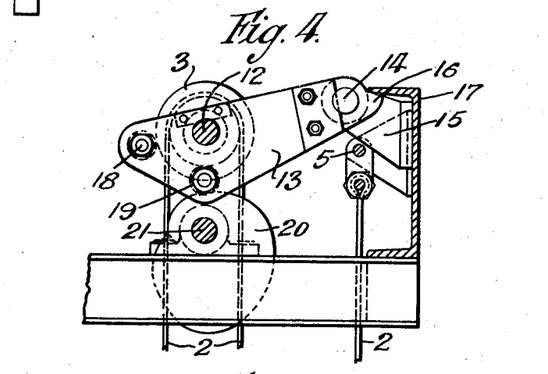
Figure 5:
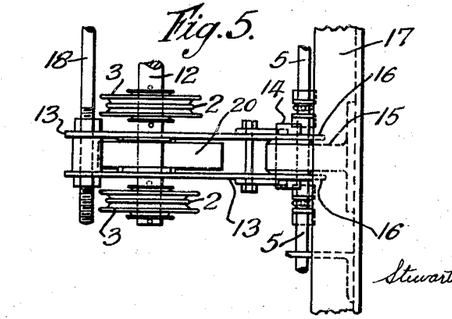

Referring now more particularly to Figures 3–5 the pulleys 3 which are grooved to take chains or wire rope are mounted in sets of five upon shafts 12 supported at their ends by pairs of lever arms 13. The arms 13 are pivotally supported at 14 by brackets 15 fixed to the framework, and are provided with lugs 16 which engage a bar 17 to limit the movement of the arms and thus the pulleys in a downward direction. 18 is a guard rod for the wire rope.

Mounted on the arms 13 beneath the shaft 12 are rollers 19 which run on cam discs 20. The cams 20 are arranged in pairs on a cam shaft 21 at 90° between pairs so that the tamping action of each set, of which there are four for a setting of twenty conductors or retorts, is balanced.

The cams shown are designed to give a 4 inch lift and to allow a quick dropping action.

The cam shaft is driven through gears indicated at 22 and thence by a chain drive 23 from a motor 24.

It will thus be seen that up and down movement is imparted by the cams 20 to the pulleys 3 supporting the tamping ropes.

*Counterweights*

Referring now to Figures 6–9 the pulleys 4 are rotatably mounted between side plates 25 supported by trunnions 26 on a guide block 27 slidable upon a squared guide rod 28 forming a brake bar. Rotation of the pulley 4 in a direction due to the tension in the rope is limited by a pawl 29 and ratchet 30, for which purpose also the clutch pulley is preferably V grooved, to grip the rope so that a retarding action is imparted to the tampers when descending, and which prevents a high velocity being attained when the latter are moving into the retorts.

Fixed between the side plates at a point above the trunnions is a brake shoe 31 one face 32 of which is adapted to lock by friction against the brake bar 28. This shoe is also formed with a curved surface to cooperate with a bevel trip block 33 as hereinafter explained.

A second shoe 34 which functions also as a counterweight, is secured between the plates 25. This shoe 34 has a rounded nose to engage the guide block when the pulley is in the brake-on position and locked to the brake bar, and thus balance the thrust of a release rod.

35 are release rods, the guide blocks 27 being drilled a clearance fit to receive the same. Fast on each release rod is a block 36 to which are pivoted release levers 37 adapted to be moved into engagement with the pulley guide block 27 in order to hold the brake shoe 31 on the brake bar 28 away from the guide rod. In this position the brake shoe 31 is prevented from moving into locking (brake-on) position with the guide rod owing to the engagement of the trip block 33 with the faces 31' of the brake shoe 31. In this position therefore the pulley blocks are free to move upwardly to permit the lowering of the tampers into the retorts.

In operation any pull on the pulley 4 from the tampering weight side causes the brake shoe 31 to grip the guide rod and so prevents the clutch sliding up the rod while if there is any slack present the weight of the pulley itself assisted by the counterweight 34 causes the clutch to partly rotate about the trunnions and relieve the grip of the brake shoe.

Figure 6:
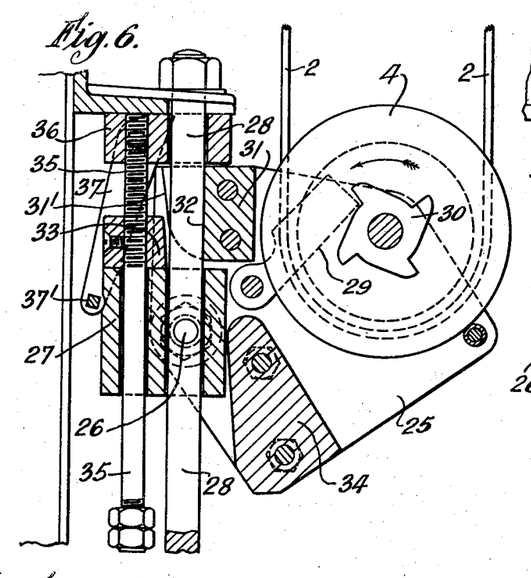
Figures 6, 7, 8 and 9 are detail views on a larger scale of clutch mechanism for taking up slack in the tamping rope.
Figure 7:
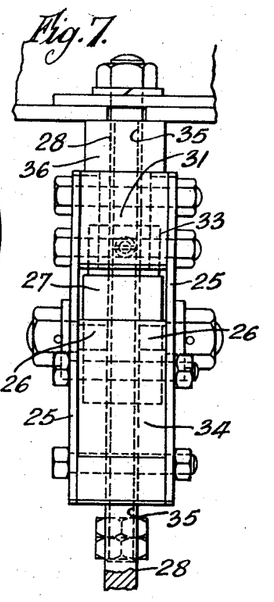
Figure 8:
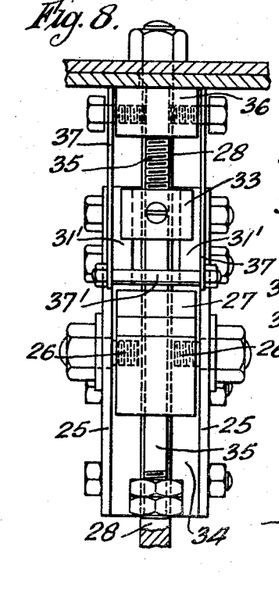
Figure 9:
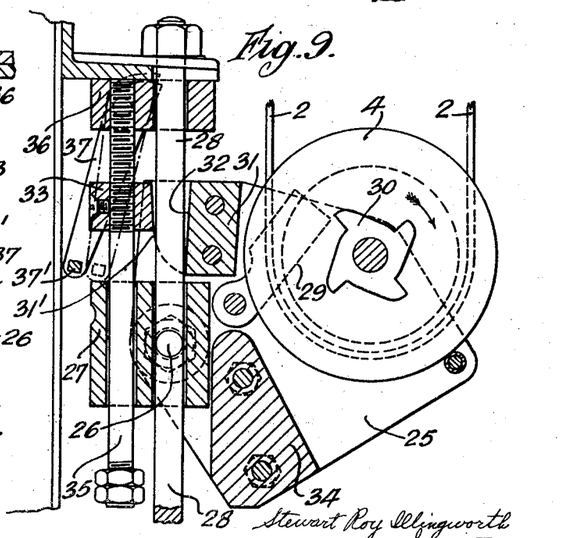

Figure 6 shows the clutch in the on position with the face 32 of the brake shoe 31 flush with the bar 28, while Figure 9 shows the brake in the off position when the face 32 owing to the movement of the clutch about the trunnions has moved away from the bar 28. As the brake shoe 31 is released the weight of the clutch as a whole causes it to slide down the guide bar 28 and take up the slack. This motion is repeated until the conductor is full, and the clutch has fallen to a position which may be about one foot six inches from the foot of the guide rod. This one foot six inches will allow the tamper head to be raised another three feet as the travel of the clutch is only half that of the tamper head (by reason of the single fall).

As the tampers are raised clear of the setting as hereinafter described slack will be caused in the rope. This slack is taken up by the clutch sliding down to its lowest position. The impact of the clutch falling is taken by the release rod which is caused to slide up the hole in the guide block. In this position the trip block 33 which is attached near the upper end of the rod, forces the brake shoe clear of the guide rod and as the shoe is now out of action the clutch is free to move up the guide rod when the tamperheads are lowered.

The trip block 33 is prevented from slipping clear of the brake shoe 31 by the release levers 37 which are pivoted, on either side, of the block 36 which is attached to the top end of the release rod 35 and which also slides on the guide rod. These release levers are connected at their lower end by a horizontal square rod 37' which rests on the guide block when the release rod is in the up position. On lowering the tundish and tamper head the clutch moves up the guide rod a distance of one foot six inches, when the tundish is placed into position over the conductors and rest on the setting. As soon as the finger plate (referred to hereinafter) is disengaged from the balls of the tamper ropes the tampers are free to fall by their own weight. To prevent excessive speed in the falling of the tamper heads the gravity pawl 29 is pivoted to the side plates of the clutch, and ratchet teeth 30 are cast on the side of the clutch pulley. This prevents the pulley turning while the clutch is sliding up the guide rod, and as the pulley is acutely grooved it forms a break for the rope. On the tamper heads reaching their lowest position, the clutch assumes the top position shown in Figures 10 and 11.

The impact is taken by the release rod through the medium of the block 36 fixed to its top end.

The upper ends of the release levers 37 pivoted to this block 36 come in contact with a channel iron on the hopper side and are depressed by the impact. This action causes the square rod 37' connecting their lower ends to be removed from the top of the guide block 27, allowing the release rod 35 to drop and so free the brake shoe 31, the clutch is now ready for the next tamping cycle.

*Discharge doors*

Figures 10, 11:
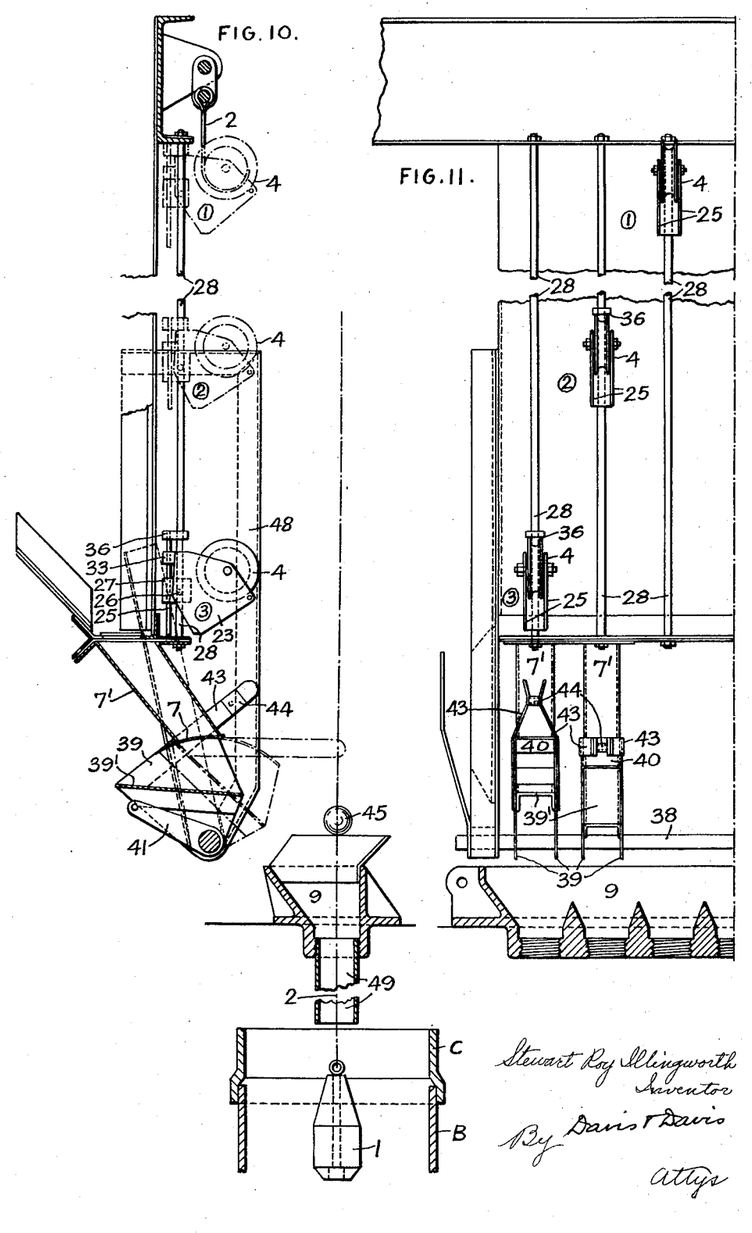
Figures 10 and 11 are views illustrating the operation of the clutch mechanism.

Figures 10 and 11 illustrate more particularly the discharge from the hopper to the tundishes 9 through the doors 8. The doors are mounted to pivot on a shaft 38 and each door comprises side plates 39 a tray portion 39' and a circular portion 40 forming the door proper.

In the full line position in Figure 10 the door is shown closed with the circular portion 40 closing the opening 7. When the door has been opened by lever 41 it is in the position shown by dot and peck lines with the tray 39' forming a continuation of the discharge chute 7'. In this position two arms 43 attached to the door and which are bent to form a constriction 44 lie in the path of the tamping ropes, on which are balls 45 adapted to engage the constriction 44 and return the doors to their closed position.

The doors above described are arranged on the tamping side of the carriage. On the non-tamping side a simple door 46 (see Figure 14) with an operating handle 47 is provided.

Figures 10 and 11 show the pulleys 4 of the counterweights (counterpoise as hereinafter described) in three positions:

1. When the tamping weight is at its lowest level in the conductor.
2. When the tamping weight is at the bottom of its down stroke and resting on the coal at 2 inches below top coal level.
3. When the tampers and tundishes have been raised 6 inches clear of the setting.

48 are tundish guides.

*Tundish hoisting gear*

The tundishes 9 consist of cast iron plates having spaced openings corresponding in number to the retorts and each provided with feed pipes 49 for feeding the coal directly into the retorts.

Figure 12:
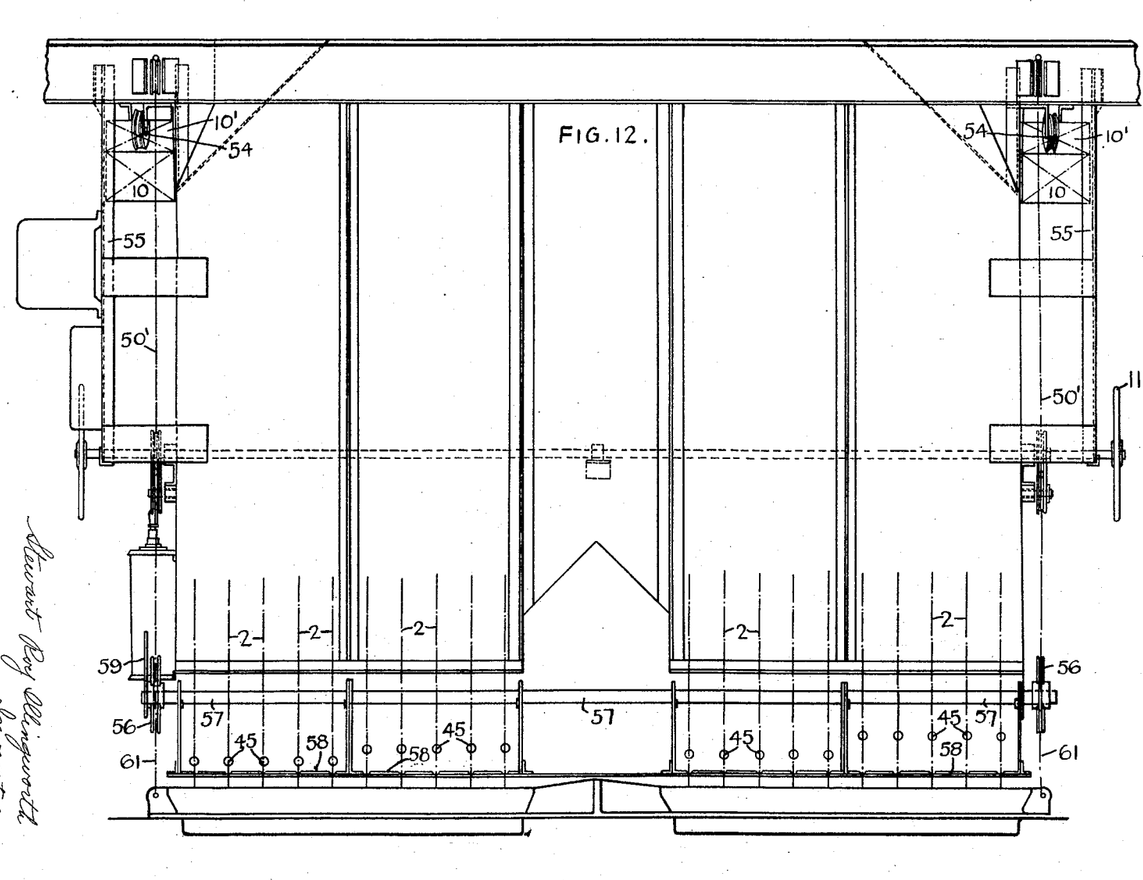
Figures 12, 13 and 14 are respectively an elevation, part plan view and end elevation of the plant showing the tundish elevating gear.
Figure 13:
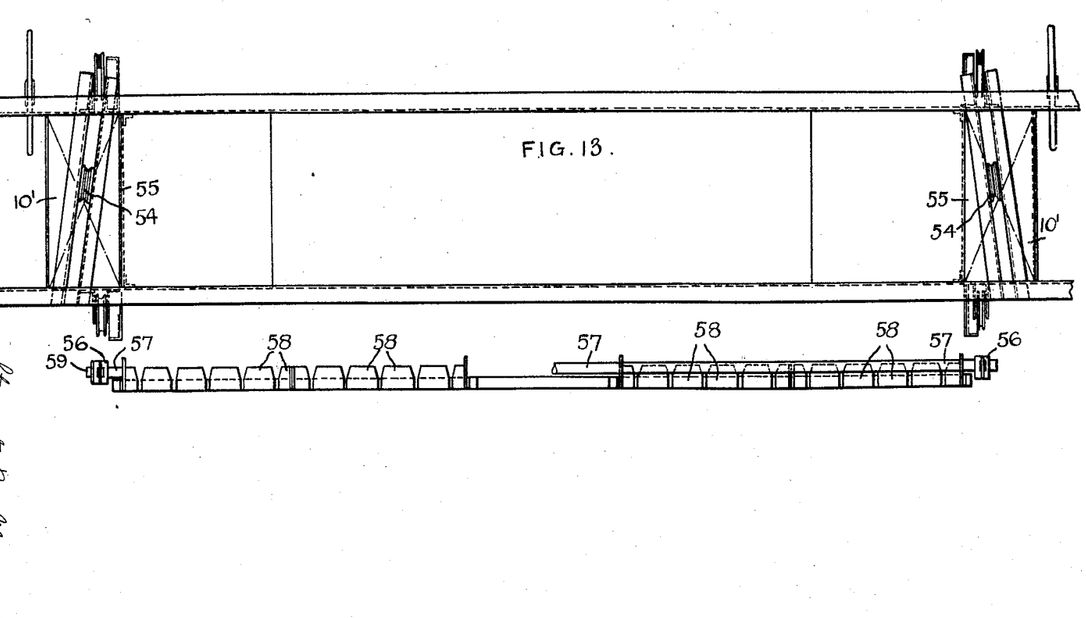
Figure 14:
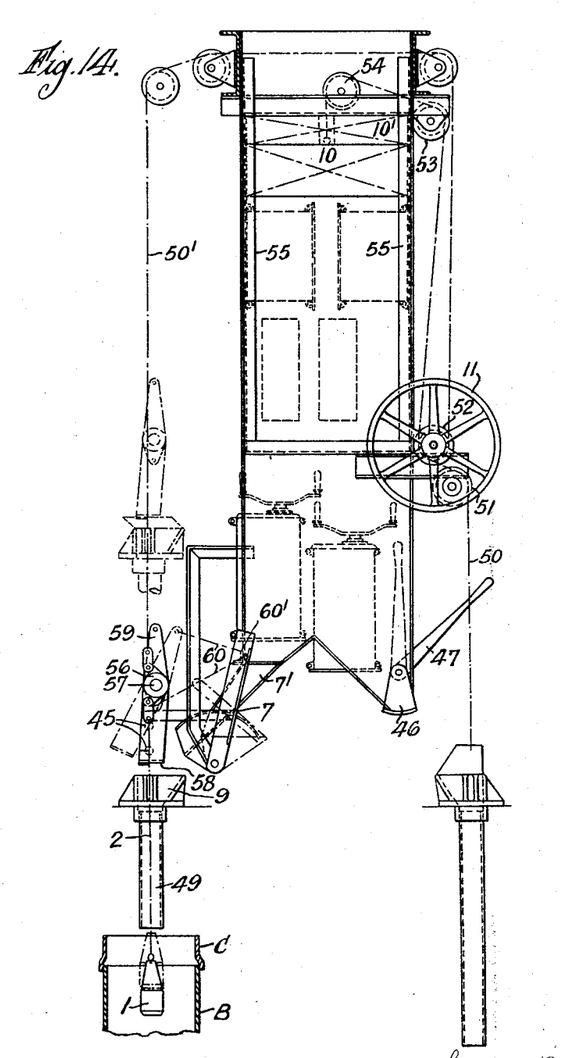

On the non-tamping side the tundish supporting ropes 50 pass over a pulley 51, thence to a driving pulley 52 on the hand wheel shaft, then via a third pulley 53 to a central pulley 54 located above a slide 55 for the counter balance weights 10. It is to be noted that the counterweights are sub-divided, one portion 10' being employed solely on the tamping side to compensate for the additional weight of the tamping members. On the tamping side there is provided a cradle indicated generally at 56 for mounting a shaft 57 carrying a number of finger plates 58 for catching up the tamping members. On the shaft 57 is a lever 59 for moving the finger plates 58 to operative position where they will engage beneath the door operating balls 45 on the tamping ropes. The lever 59 may be held in inoperative or operative position by a chain 60 attached at 60' to the framework. The cradle 56 is supported by ropes indicated at 50' but which as hereinafter explained can be used to lift the tundishes on the non-tamping side. A chain 61 connects the tundish to the cradle 56.

*Alternative pulley mechanism*

Referring now to Figures 15–20 each tamping rope 2 is passed over a friction pulley 64, and thence to a counterpoise 65 slidable upon a guide 66, the rope finally being made fast to the framework.

The friction pulleys are freely mounted on a shaft 67 and an intermittent movement is imparted thereto by a revolving disc 68 driven through gearing 69 from a motor 70. The friction pulley (see Figure 16) is made in two portions 64 and 64', one portion 64 being recessed to receive an annulus on the second portion 64' to permit of relative separation between each portion. The two portions are held to each other by bolts 71 and springs 72. Each portion has a flange 73 bent outwardly to form a V shaped groove with which co-operates a similarly shaped enlarged segmental portion 74 on the disc 68.

Figures 16, 17, 18, 19, 20:
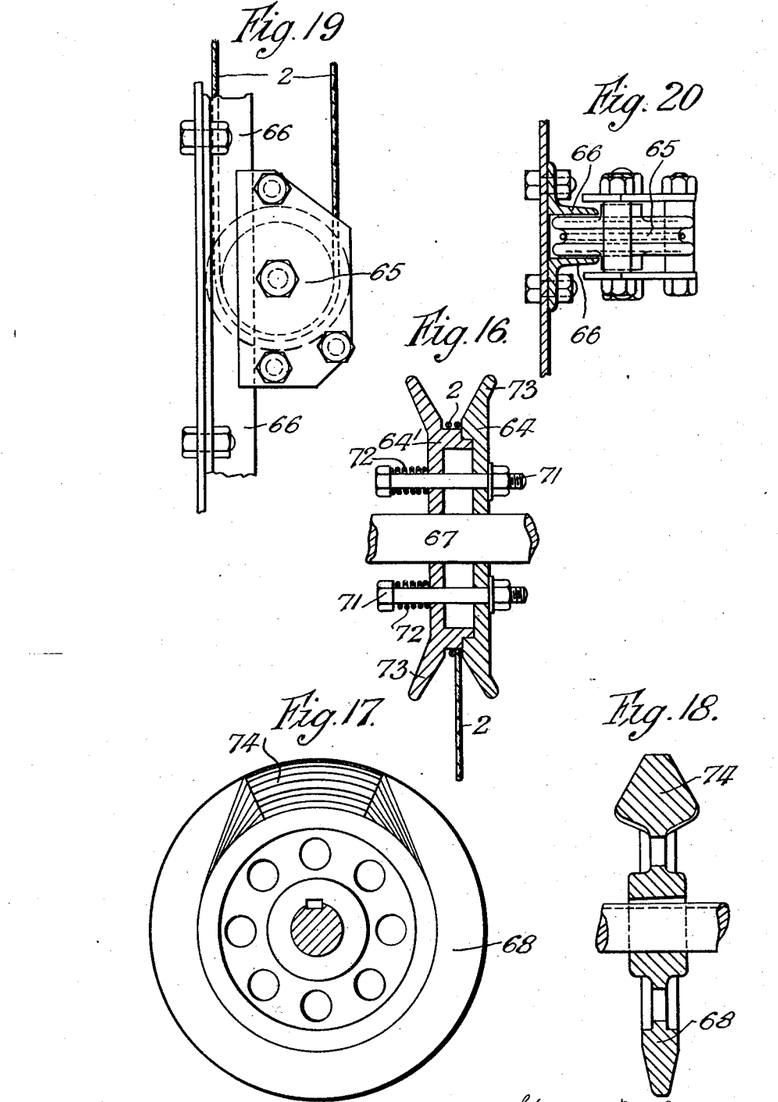

In operation as the segment 74 makes contact with the friction pulley, the flanges are forced apart thereby providing the necessary friction to grip the segment on the revolving disc to cause the friction pulley to rotate until the segment has completed its arc of contact. The friction pulley then rotates back in the opposite direction owing to the weight of the tamper head which has been raised and which is heavier than the counterpoise, the latter taking up any slack caused by the admission of fresh coal to the conductors.

Figure 15:
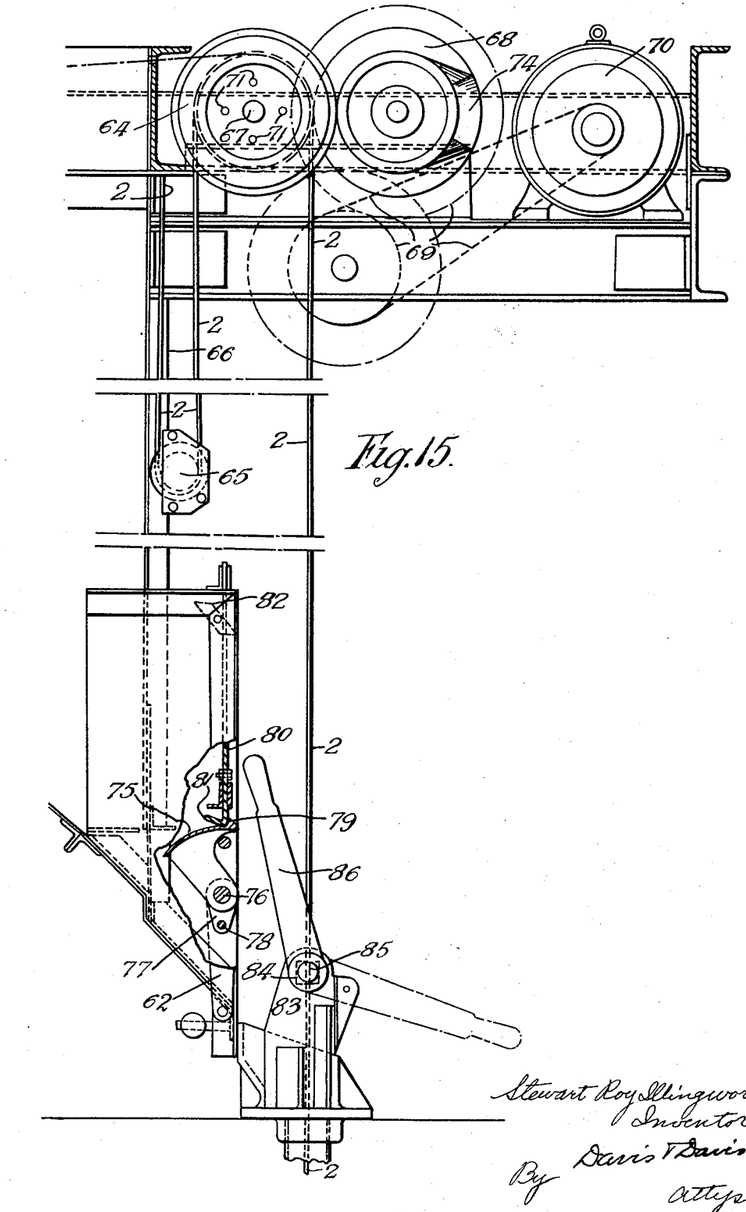

Referring now to Figure 15 quadrant doors of an alternative construction are shown consisting of a simple plate 75 freely mounted on a shaft 76. On the shaft 76 are a plurality of levers 77 carrying a door setting rod 78. The rear edge of each door is provided with a projection 79 adapted to engage the end of a retaining bar 80 bent at its lower end 81 to enable the door projection 79 to slide easily past it. The bar 80 is slidable vertically and can be raised by a lever 82.

In operation the doors 75 are set by rotating the shaft 76 by means of a hand lever 62 to cause the rod 78 carried by the levers 77 to rotate the doors on the shaft 76 until they engage the lower ends of the bars 80, in which position the doors are held with the discharges open.

It will be noted that when the counterpoise 65 is in its lowermost position, at which time the retorts will have been fully charged and the tamping weights at the top of the retorts, it will engage the catch lever 82 thereby raising the bar 80 to release the door 75.

In the arrangement here shown the tundishes are provided with brackets 83 supporting a squared shaft 84 having holes 85 for the passage of the tamping ropes 2. By partially rotating the shaft 84 by means of hand lever 86 the ropes 2 are gripped and thus by further raising the latter, the tundishes are lifted.

What I claim is:—

1. The combination of a container, means for feeding granular material into the container and tamping mechanism for imparting, in succession, blows to the head of the charge within the container, which comprises a flexible nonrigid member having attached at its lower end a weight forming the tamping head, means for imparting intermittent upward movement to said non-rigid member, and means for taking up slack in the said non-rigid member with the rise of the head of the charge within the container.

2. The combination of a container, means for feeding granular material into the container and tamping mechanism for imparting, in succesion, blows to the head of the charge within the container, which tamping mechanism comprises a flexible non-rigid member having attached at its lower end a weight forming the tamping head, a lever, a pulley freely mounted on the lever over which the flexible member is passed, means for oscillating the lever about its pivot so as to impart intermittent upward movement to the flexible member, and means for taking up slack in the member caused by the rise of the head of the charge within the container.

3. The combination of a container, means for feeding granular material into the container and tamping mechanism for imparting, in succession, blows to the head of the charge within the container, which tamping mechanism comprises a flexible non-rigid member having attached at its lower end a weight forming the tamping head, a lever, a pulley freely mounted on the lever over which the flexible member is passed, cam operated means for oscillating the lever about its pivot in order to impart an intermittent upward movement to the flexible member, and means for taking up slack in the member caused by the rise of the head of the charge within the container.

4. The combination of a container, means for feeding granular material into the container and tamping mechanism for imparting, in succession, blows to the head of the charge within the container, which tamping mechanism comprises a flexible member having attached to its lower end a weight forming the tamping head, a supporting friction pulley over which the flexible member is passed, driving means for imparting rotational movement to the pulley in a direction to raise the tamping weight and clutch means for periodically automatically coupling the driving means to the pulley.

5. An arrangement as claimed in claim 4 comprising a friction pulley formed in two portions with a flange on each and which portions are capable of axial separation, spring means for maintaining the two portions in normal position, and a disc having a segmental cam adapted frictionally to engage between the flanges of the pulley, substantially as described.

6. An arrangement as claimed in claim 4 in combination with a gravity operating counterpoise for taking up slack in the flexible member caused by the rise of the head of the charge within the container.

7. The combination of a container, means for feeding granular material into the container and tamping mechanism for imparting in succession, blows to the head of the charge within the container, which tamping mechanism comprises a flexible member having attached at its lower end a weight forming the tamping head, means for imparting intermittent upward movement to said member and a gravity operating counterpoise for taking up slack in the member caused by the rise of the head of the charge within the container.

8. The combination of a container, means for feeding granular material into the container and tamping mechanism for imparting in succession, blows to the head of the charge within the container, which tamping mechanism comprises a flexible member having attached at its lower end a weight forming the tamping head, means for imparting intermittent upward movement to said member, a vertical guide bar, a counterpoise slidably mounted on the guide bar and having a pulley over which the flexible member is passed.

9. An arrangement as claimed in claim 8 in which the counterpoise comprises a clutch adapted automatically to exert a braking action on the guide bar, the arrangement being such that the tension in the rope, due to the weight of the tamping member, holds the brake in the "on" position until the tension in the rope is relieved.

10. In tamping mechanism the combination of a flexible member having attached at its lower end a weight forming the tamping head, means for imparting intermittent upward movement to said member, and a gravity operating counterpoise for taking up slack in said member which comprises a vertical guide bar, a guide block slidable on the guide bar and having trunnions, side plates supported by said trunnions, a pulley over which the flexible member is passed mounted between the side plates, a brake shoe carried by the side plates, which brake shoe is arranged above the trunnion axis and adapted to co-operate with the braking surface on the guide bar.

11. An arrangement as claimed in claim 10 comprising pawl and ratchet mechanism for preventing rotation of the pawl in one direction.

12. An arrangement as claimed in claim 10 in which release mechanism is provided for releasing the brake when the counterpoise has reached the limit of its travel in a downward direction.

13. In tamping mechanism suitable for charging granular material in a substantially vertical container, the combination of a flexible non-rigid member such as a wire rope having attached at its lower end a weight forming the tamping head which is adapted to enter the container for the tamped material, means for imparting intermittent upward movement to said flexible member, a gravity operating counterpoise for taking up slack in the flexible member caused by the rise of the charge within the container, a storage bunker having a discharge opening for delivering material into said container, a closure device for said opening, closure actuating means, and means operated by the counterpoise to operate said closure actuating means to close the closure device when the counterpoise has reached a certain position dependent upon the head of material in the container.

14. An arrangement as claimed in claim 13 wherein a travelling carriage is provided for supporting a plurality of tamping members in which adjacent tamping members or sets of members are arranged to balance each other.

In testimony that I claim the foregoing as my invention, I have signed my name this fifth day of December 1931.

STEWART ROY ILLINGWORTH.